May 26, 1925.
J. D. FRY
1,539,176
AUTOMOBILE BUMPER
Filed July 28, 1924
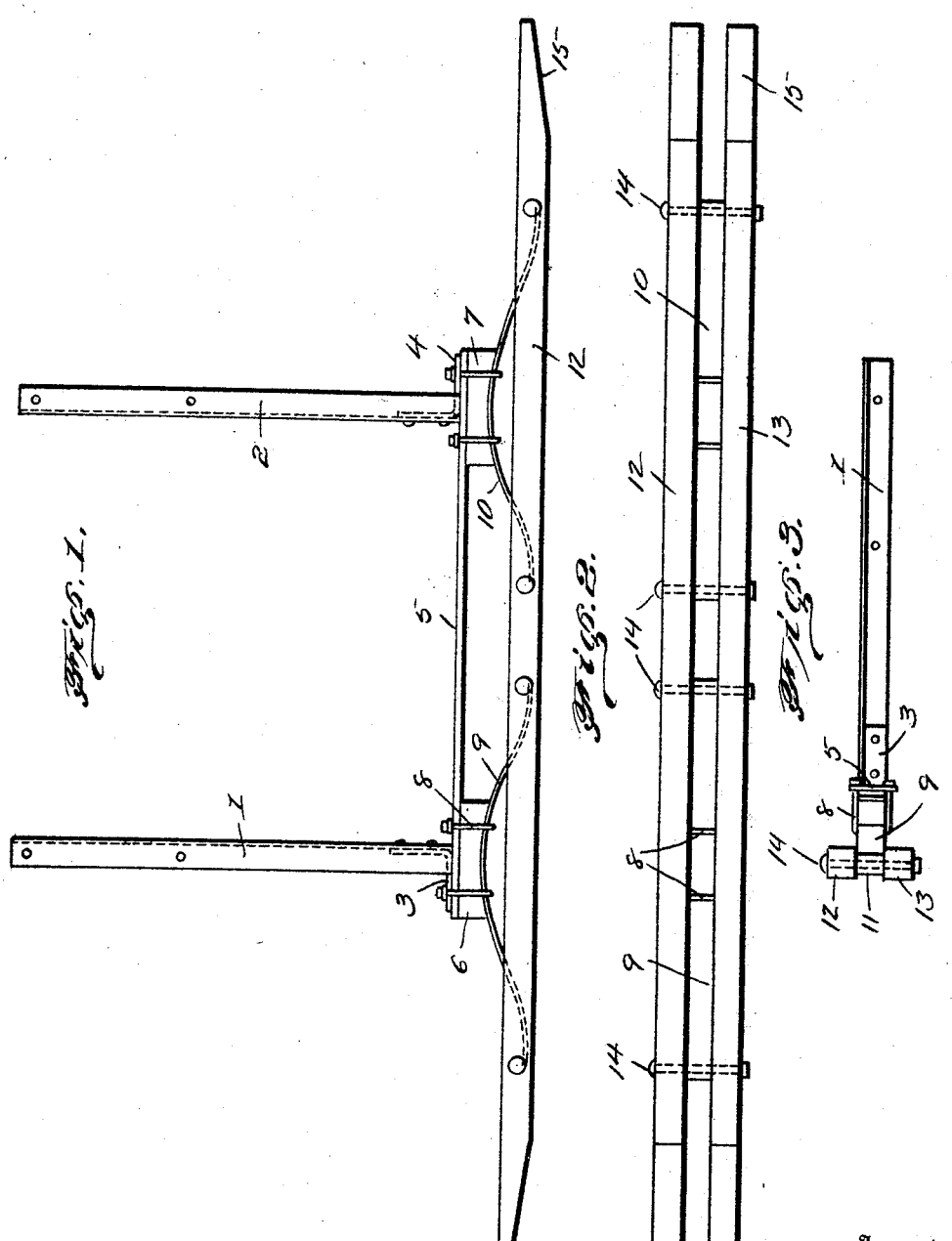

Patented May 26, 1925.

1,539,176

UNITED STATES PATENT OFFICE.

JAY D. FRY, OF COLON, MICHIGAN.

AUTOMOBILE BUMPER.

Application filed July 28, 1924. Serial No. 728,677.

*To all whom it may concern:*

Be it known that I, JAY D. FRY, a citizen of the United States, residing at Colon, in the county of St. Joseph and State of Michigan, have invented certain new and useful Improvements in an Automobile Bumper, of which the following is a specification.

This invention relates to new and useful improvements in automobile bumpers and has for its principal object to provide a simple and efficient device which may be readily and easily placed in position on either the front or rear end of the motor vehicle and will at all times be positive and efficient in protecting the automobile from damage by other vehicles.

A further object of the invention is to provide an automobile bumper of the above mentioned character, which is simple in construction, inexpensive, strong and durable and furthermore adapted for the purposes for which it is designed.

Other objects and advantages of this invention will become apparent during the course of the following description.

In the accompanying drawing forming a part of this specification and in which like numerals designate like parts throughout the same, Figure 1 is a top plan view of an automobile bumper embodying the present invention.

Figure 2 is a front elevation thereof, and

Figure 3 is a side elevation of the same.

In the drawing wherein for the purpose of illustration is shown the preferred embodiment of my invention the numerals 1 and 2 designate a pair of angle iron supporting brackets which are adapted to be secured at their inner ends to the end portions of a motor vehicle to which the bumper is to be attached. Secured to the forward end of the angle iron supporting brackets 1 and 2 respectively are the angular strips 3 and 4 respectively and the purpose thereof is to provide a means for supporting across the forward end of the bracket the metallic strip 5. The strip 5 will assist in holding the forward ends of the brackets in a substantially rigid position and furthermore provides a means whereby the wooden blocks 6 and 7 respectively may be secured to the ends of the strip 5 through the medium of the substantially U-shaped clamping members 8 which also provide a means for supporting the substantially semi-elliptical leaf springs 9 and 10 respectively in the manner hereinafter to be more fully described.

The intermediate portions of the leaf springs 9 and 10 are secured to the front faces of the blocks 6 and 7 respectively by means of the U-shaped clamps 8 and it is to be understood that the front faces of the blocks are cut away to conform to the shape of the intermediate portion of the springs. The outer ends of both the semi-elliptical leaf springs are looped as illustrated at 11 and the purpose thereof will hereinafter be more fully described.

Cooperating with the forward portions of the semi-elliptical leaf springs are the wooden elongated bars 12 and 13 respectively. The bar 12 is adapted to extend across the upper forward edges of the leaf springs 9 and 10 while the bar 13 extends transversely across the bottom edges of the forward portions of the springs so that the free ends of the springs will be interposed between the bars and for the purpose of securing the wooden bars in proper position on the springs, suitable fastening bolts such as are shown at 14 extend through registering openings provided in the bars and through the looped portions 11 of the ends of the semi-elliptical springs in the manner clearly illustrated in the drawings. This construction permits the wooden bars to be supported in parallel spaced relation with respect to each other and furthermore the springs 9 and 10 will space the bars from the wooden blocks 6 and 7 and the forward ends of the supporting brackets 1 and 2 respectively. The bars are of such length as to extend beyond the opposite sides of the motor vehicle to which the bumper is attached in the manner as is obvious from the construction as shown in the drawing, and if desired, the front portions of the bars may be cut away at the ends as illustrated at 15 in the drawing.

It will thus be seen from the foregoing description, that an automobile bumper has been provided which may be manufactured at a very low cost and will at all times be strong and durable and positive in carrying out the purposes for which the same is designated.

While I have shown the preferred embodiment of my invention, it is to be understood that various changes in the size, shape and arrangement of parts may be resorted to without departing from the spirit of the invention and the scope of the appended claim.

Having thus described the invention, what I claim is:—

An automobile bumper comprising a pair of supporting brackets, a metallic strip extending transversely across the forward ends of the brackets, wooden blocks at the ends of said strips, a semi-elliptical leaf spring secured at its intermediate portion to each block, the ends of each spring being looped, a pair of elongated wooden bars extending across the upper and lower edges respectively of the forward portions of the springs, said bars being spaced from the wooden blocks, and fastening bolts extending through the bars and the looped ends of the springs.

In testimony whereof I affix my signature.

JAY D. FRY.